United States Patent
Bosarge

(10) Patent No.: US 10,136,750 B2
(45) Date of Patent: Nov. 27, 2018

(54) PLASTIC CONTAINER FOR BOILING WATER

(71) Applicant: Douglas L. Bosarge, Irvington, AL (US)

(72) Inventor: Douglas L. Bosarge, Irvington, AL (US)

(*) Notice: Subject to any disclaimer, the term of this patent is extended or adjusted under 35 U.S.C. 154(b) by 49 days.

(21) Appl. No.: 14/671,473

(22) Filed: Mar. 27, 2015

(65) Prior Publication Data

US 2016/0278566 A1    Sep. 29, 2016

(51) Int. Cl.
    *A47J 27/21* (2006.01)
(52) U.S. Cl.
    CPC .............. *A47J 27/21016* (2013.01)
(58) Field of Classification Search
    CPC ............. A47J 27/21033; A47J 27/21; A47J 27/21066; A47J 27/21016; A47J 27/21008; A47J 27/004; A47J 27/002; A47J 27/006; A47J 27/21083; A47J 27/02; H05B 3/82; H05B 3/04; H05B 3/80; H05B 3/78; H05B 3/06
    See application file for complete search history.

(56) References Cited

U.S. PATENT DOCUMENTS

| | | | | | |
|---|---|---|---|---|---|
| 5,508,494 | A | * | 4/1996 | Sarris | A47J 31/005 219/385 |
| 5,693,244 | A | * | 12/1997 | Pragt | A47J 27/21066 219/429 |
| 2005/0117894 | A1 | * | 6/2005 | Khoury | A47J 27/21016 392/313 |
| 2009/0035433 | A1 | * | 2/2009 | France | B65D 81/34 426/510 |

FOREIGN PATENT DOCUMENTS

GB              694566         *    7/1953

* cited by examiner

*Primary Examiner* — Shawntina Fuqua
(74) *Attorney, Agent, or Firm* — AdamsIP, LLC; Stephen Thompson; Gary N. Stewart

(57) ABSTRACT

A plastic container for boiling water is provided. The plastic container is lightweight, inexpensive to manufacture, and safe for cooking food by boiling. The plastic container is made of food grade high density polyethylene having a melting point of at least 120 degrees Celsius. The container includes a water heater having a heating element located near the bottom of the container. The water heater is securely attached to the side wall of the container and can be plugged into a standard alternating current electrical outlet. The water heater is capable of heating water to boiling temperature.

19 Claims, 3 Drawing Sheets

PLASTIC CONTAINER FOR BOILING WATER

FIELD OF THE INVENTION

A preferred embodiment of the invention is directed to an apparatus for boiling food and a method of manufacturing said apparatus.

BACKGROUND

Boiling is one of many methods utilized for cooking food. For some types of seafood, in particular, boiling is often the preferred method of cooking. For instance, crabs, shrimp, crawfish, and other types of shellfish are often cooked by boiling. Seafood is typically boiled in a relatively large pot made of stainless steel or cast iron. In order to boil the large quantity of water normally required, the pot is typically placed on a burner fueled by propane from a portable propane tank.

There are a number of problems that exist with using this method for boiling seafood. First, the pot, burner, and propane tank are all heavy due to the fact that they are constructed entirely of metal. Thus, this equipment is inconvenient to move or transport. In addition, the equipment is expensive, and the propane tank must be periodically refilled, thereby adding further expense and inconvenience. Furthermore, the propane burner produces an open flame, which can be a fire hazard. Therefore, this method of boiling is typically done outdoors in an open space, which causes inconvenience in finding such an open space and transporting the equipment to that space.

Thus, a need exists in the art for an apparatus for boiling water for cooking that is lightweight and easy to transport. In addition, a need exists in the art for an apparatus for boiling water that is simple and inexpensive to manufacture. Furthermore, a need exists in the art for an apparatus for boiling water that does not produce an open flame and thus is not a fire hazard.

SUMMARY

In accordance with the present invention, an apparatus for boiling water is provided. The apparatus comprises a food grade plastic container and an electric water heater. The water heater comprises a heating element disposed within the bucket. The container is preferably a plastic bucket holding a maximum of about five gallons of water. The plastic bucket is preferably made of high density polypropylene. The water heater is preferably attached to the side wall of the bucket such that the heating element is in a substantially horizontal position near the bottom of the bucket. The heating element is powered by electrically connecting the element to a standard alternating current electrical outlet. When electrical current flows through the element, the element provides enough heat to boil the water in the bucket. Once the water is heated to a boil, food can then be added to the water and cooked inside the bucket. The apparatus is lightweight, inexpensive, and safe to operate.

Accordingly, one object of the present invention is to provide an apparatus for boiling water that is lightweight and easy to transport. Yet another object of the present invention is to provide an apparatus for boiling water that is simple and inexpensive to manufacture. Furthermore, an object of the present invention is to provide an apparatus for boiling water that is safe to operate either indoors or outdoors.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

In accordance with the present invention, an apparatus for boiling water is provided. FIGS. 1-5 illustrate preferred embodiments. The apparatus of the present invention comprises a plastic container and an electric water heater comprising a heating element. The heating element is disposed within the container, preferably in a horizontal position near the bottom of the container. Water is added to the container and the heating element is used to boil the water, typically for the purpose of cooking food, though the water may be boiled for other purposes, such as purification for drinking. The apparatus is lightweight, inexpensive to manufacture, and safe for cooking food by boiling. The apparatus may be used in any location having access to an alternating current electrical outlet, whether indoors or outdoors.

Figure 1:
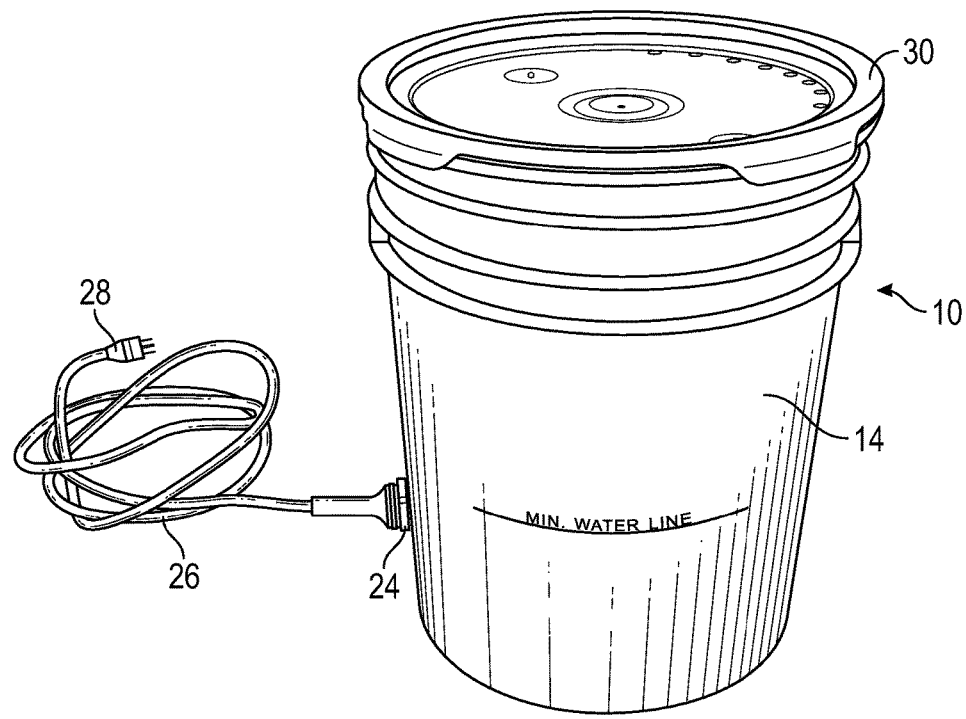
FIG. 1 is a perspective view of an apparatus embodying principles of the present invention.
Figure 3:
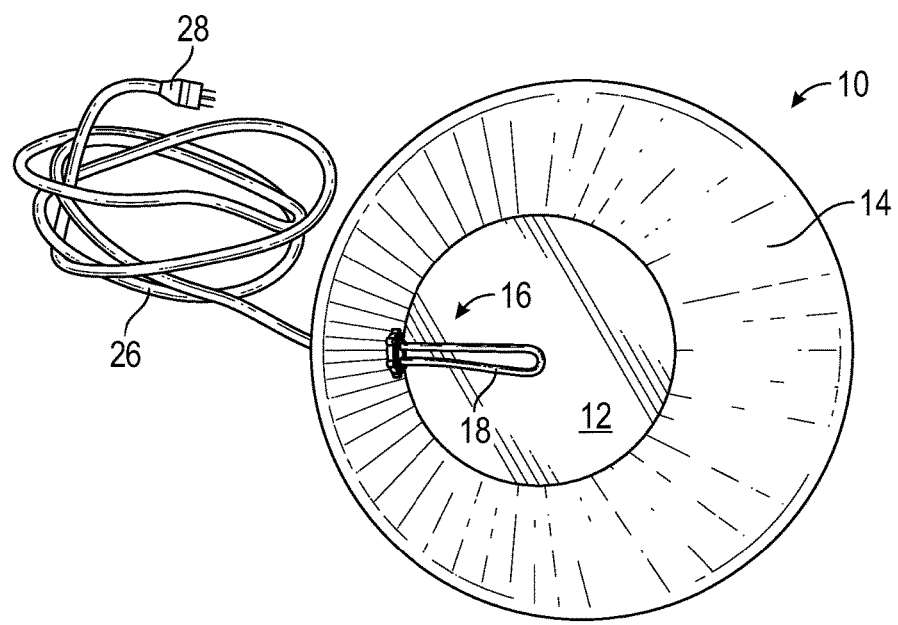
FIG. 3 is a top plan view of an apparatus embodying principles of the present invention.

As illustrated in FIGS. 1 and 3, the plastic container is preferably a plastic bucket 10. The bucket 10 is a food grade plastic bucket, preferably made from high density polyethylene (HDPE) plastic. The bucket 10 should be made of plastic having a melting point of at least 120 degrees Celsius so that it can be safely used to boil water without melting the plastic of the container. Preferably, the bucket 10 is made from HDPE having a melting point of about 130 degrees Celsius to about 145 degrees Celsius. Furthermore, the bucket 10 must be a food grade plastic bucket. As used herein, the term "food grade" indicates that no dyes, recycled plastics, or other chemicals harmful to humans have been used in the production of the plastic container. The food grade requirement is necessary so no leaching of harmful chemicals from the plastic occurs when the plastic container is used to boil water and/or hold cooked food after boiling.

The bucket 10 preferably holds approximately five gallons of water and has similar dimensions as a standard five-gallon bucket, though it may hold various quantities of water and still fall within the scope of the present invention. In a preferred embodiment, as shown in FIG. 1, the outside of the bucket 10 has a "minimum water line" to indicate a preferred minimum amount of water that should be added to the bucket 10 before boiling. In the preferred embodiment, this line corresponds to a water volume of approximately two gallons in the bucket 10. A preferred volume of water used for cooking is about 1.5 gallons to about 3.5 gallons.

Figure 2:
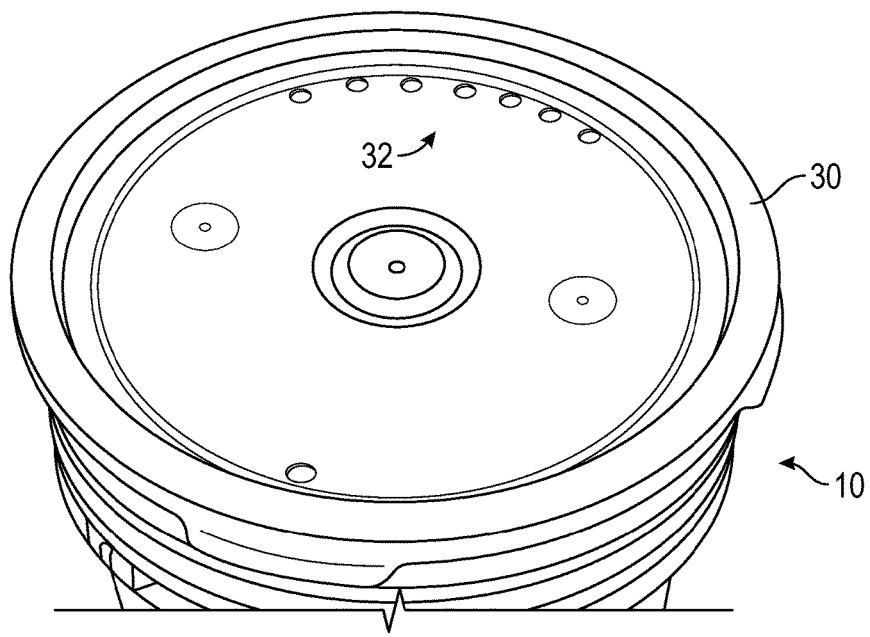
FIG. 2 is a perspective view of an apparatus embodying principles of the present invention.

The apparatus preferably comprises a lid 30 sized to fit securely around the upper rim of the bucket 10. As shown in FIG. 2, the lid 30 has at least one hole, and preferably several holes 32, extending through the lid 30 such that the interior of the bucket 10 remains in fluid communication with the exterior of the bucket 10. The holes 32 are present in the lid 30 in order to vent steam produced by boiling the water. Additionally, the holes 32 are present in the lid 30 in order to allow a user to easily drain water from the bucket 10 once food has finished boiling.

Figure 4:
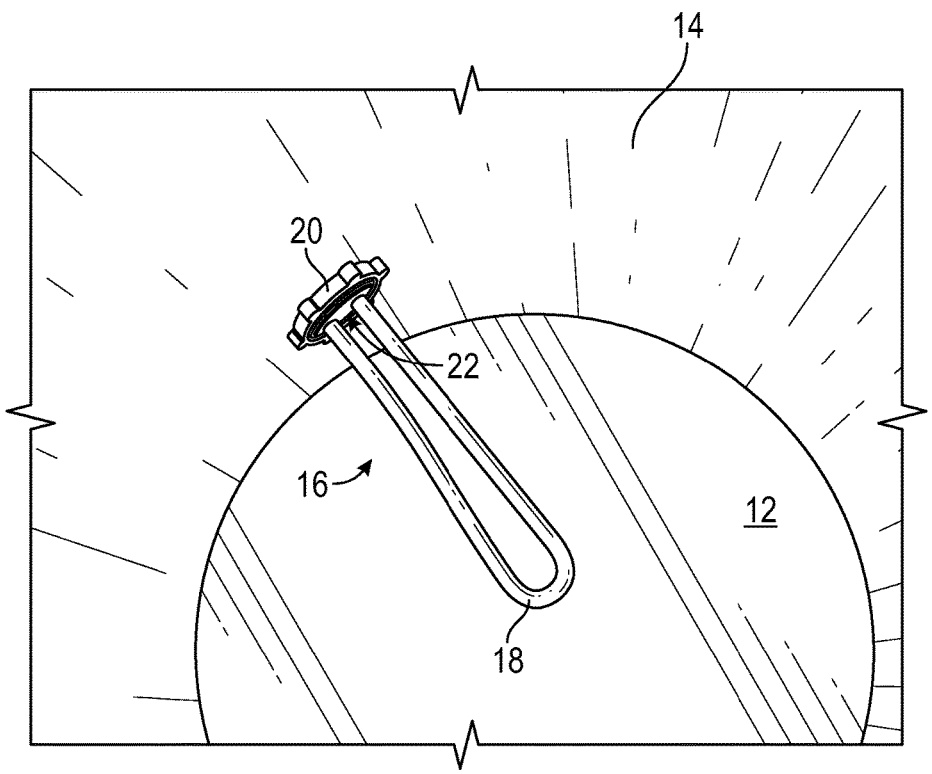
FIG. 4 is an enlarged view of the heating element depicted in FIG. 3.

In a preferred embodiment, as shown in FIGS. 1 and 3, the plastic bucket 10 has a bottom 12 and a continuous, circular side wall 14. The apparatus further comprises a water heater 16. In one embodiment, as shown in FIGS. 3 and 4, the water heater 16 is securely attached to the side wall 14 of the bucket 10 and comprises a heating element 18 disposed within the bucket 10. The heating element 18 is preferably located near the bottom 12 of the bucket 10. In a preferred embodiment, the heating element 18 is located approximately 1-2 inches above the bottom 12 of the bucket 10 in a substantially horizontal position.

In an alternative embodiment, the water heater 16 may be securely attached to the bottom 12 of the bucket 10 such that the heating element 18 is configured in a substantially vertical position. In another alternative embodiment, the water heater 16 may be attached to the side wall 14, but have a heating element 18 that is bent at an angle of about 90 degrees such that a portion of the element 18 is in a vertical position. In this case, it is preferred that the element 18 is bent in a location such that a majority of the element 18 is in a vertical position substantially parallel to the side wall 14 of the bucket 10. In either embodiment in which a vertical heating element is utilized, the amount of water added to the bucket should completely cover the heating element to prevent the element from potentially overheating.

The water heater 16 is preferably a 1500 watt, 120 volt electric heater. However, the heater 16 may have a wattage in the range of about 1000 watts to about 5000 watts, and preferably from about 1200 watts to about 2500 watts. The heater 16 preferably has a voltage of about 120 volts to about 240 volts. As illustrated in FIGS. 3 and 4, the water heater 16 preferably comprises a hairpin bent, or U-shaped, tubular element 18. The heating element 18 is suitable for immersion in water and is preferably about six inches long. The heating element 18 is preferably a metal element, preferably comprising nickel and chromium incoloy. However, the element 18 may comprise a variety of metals or metal alloys in varying ratios, including, but not limited to, nickel, chromium, stainless steel, iron, copper, zinc, and similar materials.

In order to manufacture the apparatus of the present invention, the water heater 16 must first be securely attached to the bucket 10, preferably to the side wall 14 near the bottom 12 of the bucket 10, as shown in FIGS. 3 and 4. First, a circular opening is formed in the side wall 14 of the bucket 10, preferably by drilling through the plastic side wall 14. The opening serves as the location where the heater 16 will be attached to the side wall 14. The opening extends completely through the side wall 14 and is preferably located near the bottom 12 of the bucket 10. In a preferred embodiment, the lowest point of the opening is about 1-2 inches above the bottom 12 of the bucket 10 such that the heating element 18 will be located near the bottom 12 of the bucket 10 in a substantially horizontal position.

The water heater 16 is preferably a screw-in type water heater. The heater 16 comprises a heating element 18, a flange 24, a circular screw plug fitting 22 having male threads (not shown), and a lock nut 20 having female threads corresponding to the male threads of the screw plug fitting 22. The heating element 18 is welded or brazed into the circular screw plug fitting 22, as shown in FIG. 4. The size of the circular opening formed in the side wall 14 of the bucket 10 corresponds approximately to the size of the circular fitting 22 such that the fitting 22 can be inserted through the opening.

In one embodiment, before the heater 16 is attached to the side wall 14, a gasket or O-ring (not shown) is installed to prevent water from leaking from the bucket 10 around the opening where the heater 16 is attached to the side wall 14. The gasket or O-ring will form a watertight seal around the opening in the side wall 14. In a preferred embodiment, a high temperature, food grade silicon O-ring is used in conjunction with a flat metal washer. The heating element 18 and the fitting 22 are inserted through the O-ring and then through the washer such that the O-ring and washer are positioned around the male threads of the fitting 22 and adjacent to the flange 24. A high temperature, food grade silicon O-ring is preferred because it may come into contact with the water in which the food is boiling. Alternatively, a rubber gasket may be used to form the seal.

Figure 5:
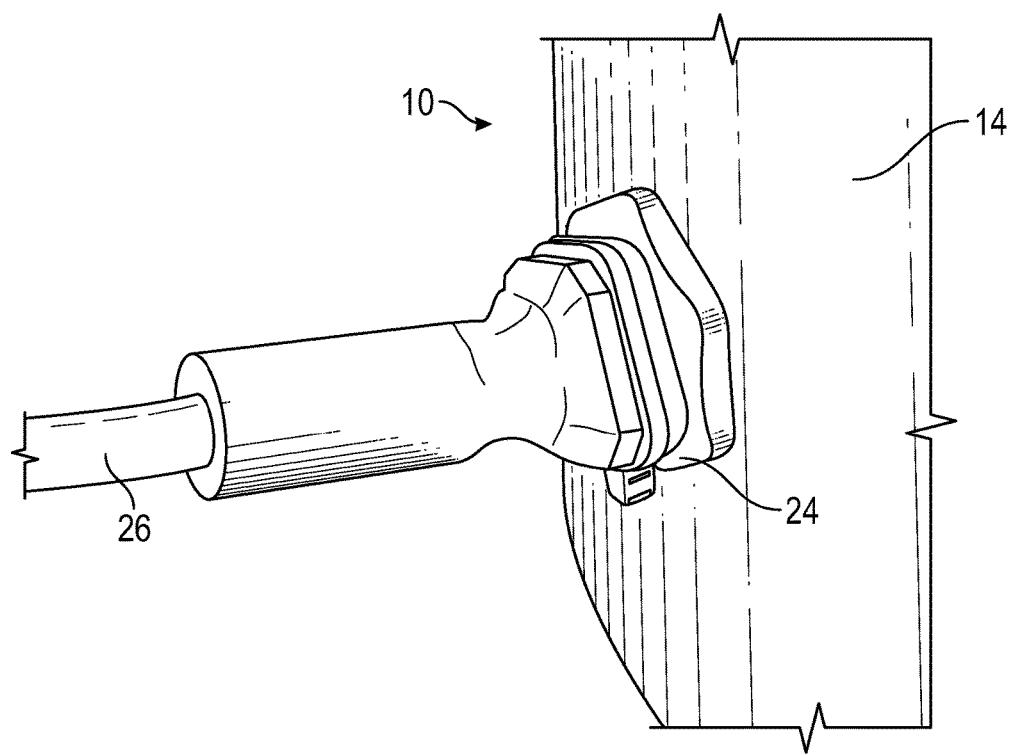
FIG. 5 is an enlarged view of a power cord electrically connected to the heating element from the exterior of the container depicted in FIG. 1.

Once the O-ring and washer are in place, the heater 16 is installed by inserting the heating element 18 through the opening from the exterior of the side wall 14 of the bucket 10. Once the heating element 18 is completely inserted through the opening, the circular fitting 22 (to which the heating element 18 is attached) is also inserted through the opening. Because the flange 24 has a greater diameter than the opening in the side wall 14, the flange 24 will function as a stopper, as shown in FIG. 5, with the O-ring and washer positioned between the flange 24 and the side wall 14. Next, the lock nut 20 is tightly threaded onto the male threads of the fitting 22 until the water heater 16 is securely attached to the side wall 14 of the bucket 10, as shown in FIG. 4. The O-ring becomes compressed when the lock nut 20 is tightened, thereby forming a watertight seal so that water will not leak from the bucket 10.

In an alternative embodiment, the water heater 16 may be attached to the bottom 12 of the bucket 10. In this embodiment, a similar method of manufacturing is utilized, except that the opening is formed in the bottom 12 of the bucket 10 instead of the side wall 14. In this embodiment, the heating element 18 is preferably configured in a substantially vertical position.

In another alternative embodiment, the water heater 16 may be attached to the side wall 14 as described above, but have a heating element 18 that is bent at an angle of about 90 degrees such that a portion of the element 18, and preferably a majority of the element 18, is in a generally vertical position substantially parallel to the side wall 14 of the bucket 10. In this embodiment, a similar method of manufacturing is utilized, except that when inserting the element 18 through the opening in the side wall 14, the water heater 16 is turned by about 90 degrees as the bent portion of the element 18 passes through the opening.

Next, the heating element 18 is electrically connected to an electrical power cord 26. The power cord 26 has a plug 28 configured for use with a standard alternating current electrical outlet. Once the heater 16 is installed, water may be added to the bucket 10, and the plug 28 may then be inserted into an electrical outlet to provide current to the heating element 18 in order to produce heat. Water should be added to the bucket 10 before plugging in the heater 16 in order to prevent the heating element 18 from overheating. The heat from the element 18 will then cause the water to boil. In a preferred embodiment, the heater 16 is designed to boil about 2-3 gallons of water in no more than about one hour. Once the water is brought to a boil, the bucket 10 may then be used to cook food by boiling.

In an alternative embodiment, the water heater 16 may further comprise a thermostat for controlling the temperature of the heating element 18. The thermostat preferably comprises a rotating knob that can be used to adjust the temperature of the heating element 18 to a desired temperature for boiling water.

In another alternative embodiment, the water heater may be a flanged heater, wherein the heater is attached to the side wall of the bucket by fastening flanges together using bolts or any similar fastening means known in the art. It should be understood that any electric heater that can be securely attached to the side wall of a plastic bucket will fall within the scope of the present invention.

It is understood that versions of the invention may come in different forms and embodiments. Additionally, it is understood that one of skill in the art would appreciate these various forms and embodiments as falling within the scope of the invention as disclosed herein.

What is claimed is:

1. An apparatus for boiling water, said apparatus comprising:
   a food grade plastic container having an open end for receiving objects therein and a capacity sufficient for boiling food in water, the plastic container being defined by a body comprising a bottom wall and a peripheral wall extending upwardly from the bottom wall, the bottom wall and the peripheral wall each being made of a plastic having a melting point of at least 120 degrees Celsius; and
   an electric water heater comprising a heating element disposed within the plastic container, wherein the body has a single opening therein through which the heating element is configured to pass through.

2. The apparatus of claim 1, further comprising a lid having a plurality of holes therein, said lid being secured to the open end of the plastic container for draining water from said plastic container.

3. A method of manufacturing an apparatus for boiling water, said method comprising the steps of:
   providing a food grade plastic container having an open end for receiving objects therein and a capacity sufficient for boiling food in water, the plastic container being defined by a body comprising a bottom wall and a peripheral wall extending upwardly from the bottom wall, the bottom wall and the peripheral wall each being made of a plastic having a melting point of at least 120 degrees Celsius;
   forming a single opening within the peripheral wall;
   providing an electric water heater comprising:
      a heating element configured to pass through the single opening; and
      a flange having a diameter greater than the diameter of the single opening; and
   attaching the electric water heater to the peripheral wall such that the flange is disposed adjacent to an exterior surface of the body and the single opening and the heating element is suspended above the bottom wall.

4. The method of claim 3, wherein the bottom wall is circular and the peripheral wall is a continuous side wall.

5. The method of claim 3, wherein the plastic consists essentially of high density polyethylene.

6. The method of claim 3, wherein the electric water heater further comprises:
   a fitting having a first set of threading, wherein the heating element is secured to the fitting and the fitting is configured to pass through the single opening; and
   a nut having a second set of threading configured to interlock with the first set of threading.

7. The method of claim 6, wherein the heating element is a metal tubular heating element.

8. The method of claim 7, wherein the heating element has a first end and a second end and comprises nickel and chromium, the first end and the second end each being secured to the fitting such that the first end and the second end are adjacent.

9. The method of claim 6, wherein the single opening in the peripheral wall is circular.

10. The method of claim 9, wherein the step of forming a single opening in the peripheral wall comprises drilling a hole extending through the peripheral wall.

11. The method of claim 6, wherein the step of attaching the electric water heater to the peripheral wall comprises:
    inserting the fitting through the single opening such that the fitting is disposed above the bottom wall; and
    securing the nut to the fitting such that the first set of threading and the second set of threading are interlocked and the nut is disposed adjacent to an interior surface of the body and the single opening.

12. The method of claim 11, further comprising the step of installing a silicon O-ring around the fitting prior to securing the nut to the fitting.

13. The method of claim 3, further comprising the step of installing a gasket between the flange and the exterior surface of the peripheral wall.

14. The method of claim 3, wherein the heating element is disposed within the container such that the heating element is about one inch to about two inches above the bottom wall of the container.

15. The method of claim 3, further comprising the step of electrically connecting the heating element to an electrical power cord having a plug compatible with a standard alternating current electrical outlet.

16. The apparatus of claim 1, wherein the electric water heater further comprises:

a flange having a diameter greater than the diameter of the single opening;

a fitting having a first set of threading, wherein the heating element is secured to the fitting and the fitting is configured to pass through the single opening; and a nut having a second set of threading configured to interlock with the first set of threading.

17. The apparatus of claim 16, wherein the bottom wall is circular and the peripheral wall is a continuous side wall, wherein the single opening is disposed within the peripheral wall, and wherein the electric water heater is secured to the body such that the flange is disposed adjacent to an exterior surface of the body and the single opening, the fitting and the heating element are each horizontally suspended above the bottom wall, and the nut is disposed adjacent to an interior surface of the body and the single opening.

18. The apparatus of claim 16, wherein the bottom wall is circular and the peripheral wall is a continuous side wall, wherein the single opening is disposed within the bottom wall, and wherein the electric water heater is secured to the body such that the flange is disposed adjacent to an exterior surface of the body and the single opening, the fitting and the heating element are each perpendicular to the bottom wall, and the nut is disposed adjacent to an interior surface of the body and the single opening.

19. The apparatus of claim 16, wherein the heating element has a first end and a second end and comprises nickel and chromium, the first end and the second end each being secured to the fitting such that the first end and the second end are adjacent.

* * * * *